(12) United States Patent
Hoyer

(10) Patent No.: US 7,890,789 B2
(45) Date of Patent: Feb. 15, 2011

(54) CIRCUIT AND METHOD FOR GENERATION OF DUTY CYCLE INDEPENDENT CORE CLOCK

(75) Inventor: Gregg Hoyer, Enumclaw, WA (US)

(73) Assignee: Broadcom Corporation, Irvine, CA (US)

( * ) Notice: Subject to any disclaimer, the term of this patent is extended or adjusted under 35 U.S.C. 154(b) by 681 days.

(21) Appl. No.: 12/001,730

(22) Filed: Dec. 12, 2007

(65) Prior Publication Data

US 2009/0158077 A1 Jun. 18, 2009

(51) Int. Cl.
*G06F 1/00* (2006.01)
*H03K 3/017* (2006.01)
*H03K 5/04* (2006.01)

(52) U.S. Cl. .................. 713/500; 327/166; 327/175; 327/299

(58) Field of Classification Search .................. 713/500; 327/166, 175, 299
See application file for complete search history.

(56) References Cited

U.S. PATENT DOCUMENTS

| | | | | |
|---|---|---|---|---|
| 5,617,563 A | * | 4/1997 | Banerjee et al. ............. | 713/501 |
| 5,940,606 A | * | 8/1999 | Ghia et al. ................... | 713/500 |
| 6,111,447 A | * | 8/2000 | Ternullo, Jr. ................. | 327/292 |
| 6,320,437 B1 | * | 11/2001 | Ma .............................. | 327/175 |
| 6,903,592 B2 | * | 6/2005 | Faue ........................... | 327/291 |
| 7,126,396 B1 | * | 10/2006 | Courcy ........................ | 327/175 |
| 7,251,193 B2 | * | 7/2007 | Jung ........................ | 365/233.5 |
| 2003/0151435 A1 | * | 8/2003 | Ma .............................. | 327/175 |
| 2007/0241801 A1 | * | 10/2007 | Kim ............................ | 327/299 |

* cited by examiner

*Primary Examiner*—Vincent T Tran
(74) *Attorney, Agent, or Firm*—Farjami & Farjami LLP

(57) ABSTRACT

A disclosed embodiment is a circuit for producing a core clock from a system clock so that a core clock cycle is independent of a duty cycle of the system clock. The circuit comprises a system clock receiving sub-circuit for generating a first rising edge of the core clock, a core clock falling edge generation sub-circuit responsive to every rising edge of the core clock, and a self-triggering sub-circuit to trigger a second rising edge of the core clock so as to cause the core clock cycle to be independent of the system clock duty cycle. In one embodiment, the first core clock rising edge may be triggered in response to an initial system clock rising edge. In another embodiment, the first core clock rising edge may be triggered in response to an initial system clock falling edge. The core clock frequency may be twice the frequency of the system clock.

17 Claims, 4 Drawing Sheets

CIRCUIT AND METHOD FOR GENERATION OF DUTY CYCLE INDEPENDENT CORE CLOCK

BACKGROUND OF THE INVENTION

1. Field of the Invention

The present invention is generally in the field of electrical circuits and systems. More specifically, the present invention is in the field of clock generation in electrical circuits and systems.

2. Background Art

In system design, it is often necessary to emulate the performance of a dual port memory device using a single port core memory by employing a scheme to achieve a core clock frequency approximately twice that of the system clock. Conventional approaches to achieving this outcome may attempt to do so by utilizing both the rising edge of a system clock signal and the falling edge of the same signal, to trigger core clock signals, thereby producing two core clock signals per one system clock signal. The efficacy of that conventional approach is dependent, however, on the duty cycle of the system clock. Where, for example, the duty cycle of the system clock approximates a fifty percent duty cycle, i.e. the system clock has both its ON and OFF intervals lasting approximately half of the system clock cycle time, the conventional approach may provide an acceptable solution.

More disadvantageous, however, is the situation in which the system clock duty cycle deviates from approximately fifty percent. In that case, the deviation may produce core clock ON or OFF intervals having undesirable durations, being either too brief, or too protracted. In addition, a system clock duty cycle deviation from approximately fifty percent may produce undesirable asymmetry between the ON interval and the OFF interval of the core clock. When the deviation is substantial enough, the minimum cycle time requirement of a core clock being regulated by this procedure may not be met. Consequently, the described conventional approach, in which the core clock signals depend on the duty cycle of the system clock, is at least problematic, and may result in undesirable performance consequences.

Thus, there is a need in the art for a solution that uses a system clock to regulate a core clock, while eliminating the performance uncertainties flowing from dependence of the core clock signals on the system clock duty cycle.

SUMMARY OF THE INVENTION

Circuit and method for generation of duty cycle independent core clock, substantially as shown in and/or described in connection with at least one of the figures, and as set forth more completely in the claims.

DETAILED DESCRIPTION OF THE INVENTION

The present invention is directed to circuit and method for generation of duty cycle independent core clock. Although the invention is described with respect to specific embodiments, the principles of the invention, as defined by the claims appended herein, can obviously be applied beyond the specifically described embodiments of the invention described herein. Moreover, in the description of the present invention, certain details have been left out in order to not obscure the inventive aspects of the invention. The details left out are within the knowledge of a person of ordinary skill in the art.

The drawings in the present application and their accompanying detailed description are directed to merely exemplary embodiments of the invention. To maintain brevity, other embodiments of the invention, which use the principles of the present invention are not specifically described in the present application and are not specifically illustrated by the present drawings.

Figure 1A:
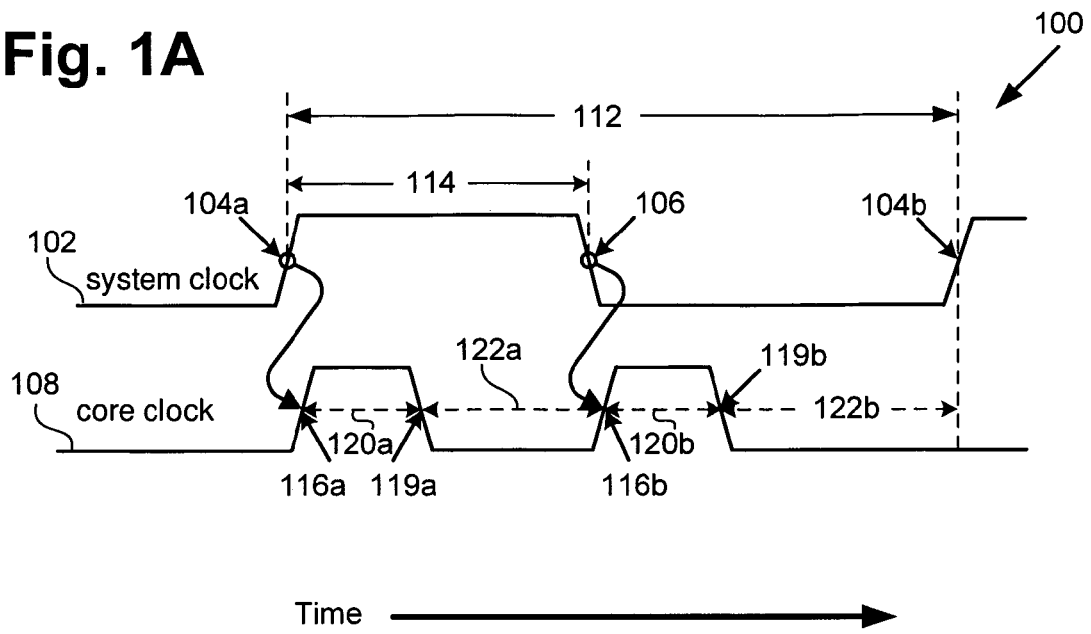
FIG. 1A shows an exemplary timing diagram corresponding to a conventional system for producing a core clock from a system clock.

FIG. 1A shows an exemplary timing diagram corresponding to a conventional system for producing a core clock from a system clock. Timing diagram 100 in FIG. 1A shows system clock 102 and core clock 108. System clock 102 includes rising edge 104a and falling edge 106, which define system clock ON interval 114, and rising edge 104b, which together with rising edge 104a defines system clock cycle time 112. Also shown in FIG. 1A are first rising edge 116a and second rising edge 116b of core clock 108, first falling edge 119a and second falling edge 119b of core clock 108, first core clock ON interval 120a, second core clock ON interval 120b, first core clock OFF interval 122a, and second core clock OFF interval 122b. As may be seen from FIG. 1A, in the conventional approach, first rising edge 116a and second rising edge 116b of core clock 108 are respectively triggered by rising edge 104a and falling edge 106 of system clock 102.

Rising edge 104a and falling edge 106 also determine the duty cycle of system clock 102, which may be defined as ON interval 114 divided by system clock cycle time 112, expressed as a percentage. Thus, if falling edge 106 occurs precisely halfway between rising edge 104a and rising edge 104b, the duty cycle of system clock 102 is fifty percent. When the duty cycle of system clock 102 is at or near fifty percent, system clock 102 will be symmetrical, i.e. ON interval 114 will substantially match the interval between falling edge 106 and the next rising edge, shown in FIG. 1A as rising edge 104b.

Figure 1B:
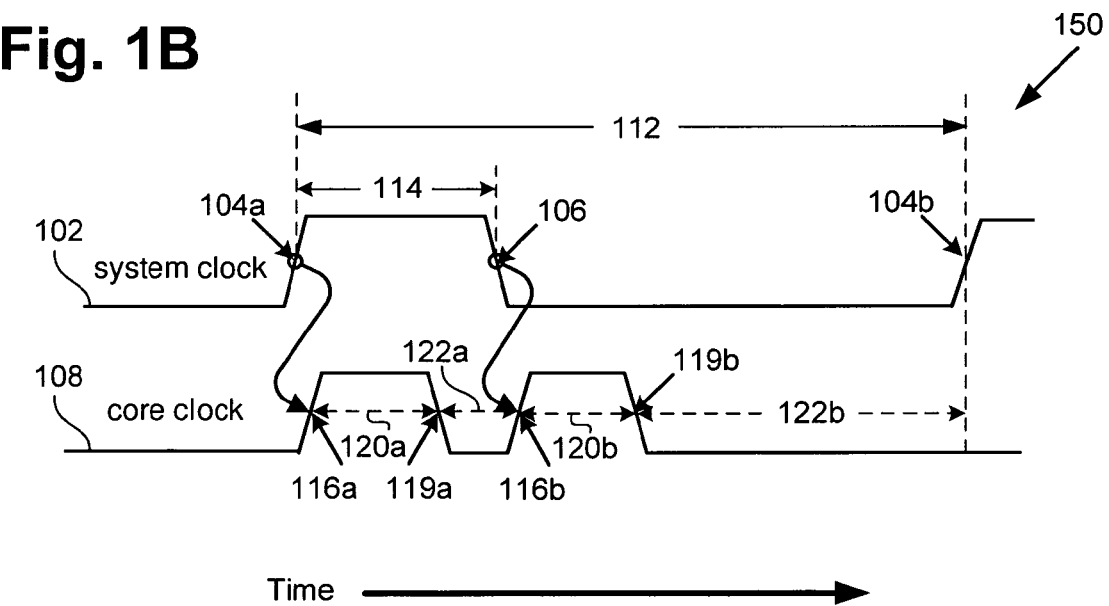
FIG. 1B shows an exemplary timing diagram corresponding to a conventional system for producing a core clock from a system clock, when the duty cycle of the system clock deviates from approximately fifty percent.

FIG. 1B shows an exemplary timing diagram corresponding to a conventional system for producing a core clock from a system clock, when the duty cycle of the system clock deviates from approximately fifty percent. Timing diagram 150 in FIG. 1B shows system clock 102 with a duty cycle less than fifty percent, for example approximately thirty percent. Because first rising edge 116a and second rising edge 116b of core clock 108 are triggered by respective rising edge 104a and falling edge 106 of system clock 102, a reduction in the duty cycle of system clock signal 102 results in a corresponding reduction in the time interval separating first rising edge 116a and second rising edge 116b of core clock 108.

Consequently, as may be seen from FIG. 1B, reduction in the duty cycle of system clock 102 causes first core clock ON interval 120a and second core clock ON interval 120b to be separated by reduced first core clock OFF interval 122a, compared to FIG. 1A, and a lengthened second core clock OFF interval 122b. Thus, reduction of the duty cycle of system clock 102 produces asymmetry in core clock 108 by producing alternating core clock OFF intervals of different duration. When deviation from a fifty percent duty cycle in system clock 102 becomes sufficiently great, first core clock OFF interval 122a may not meet a minimum required cycle time of core clock 108, resulting in failure or unreliability of a device or system regulated by core clock 108.

As may be apparent from examination of FIGS. 1A and 1B, a deviation of the duty cycle of system clock 102 that produces an increase in the duty cycle, for example to approximately seventy percent, would have a similar effect on core clock 108. Where the duty cycle deviation is marked by an increase in the duty cycle of system clock 102, first core clock OFF interval 122a would be increased, and second core clock OFF interval 122b would be correspondingly reduced. In that case, it would be second core clock OFF interval 122b that would be susceptible to falling short of a minimum required cycle time of core clock 108.

Figure 2:
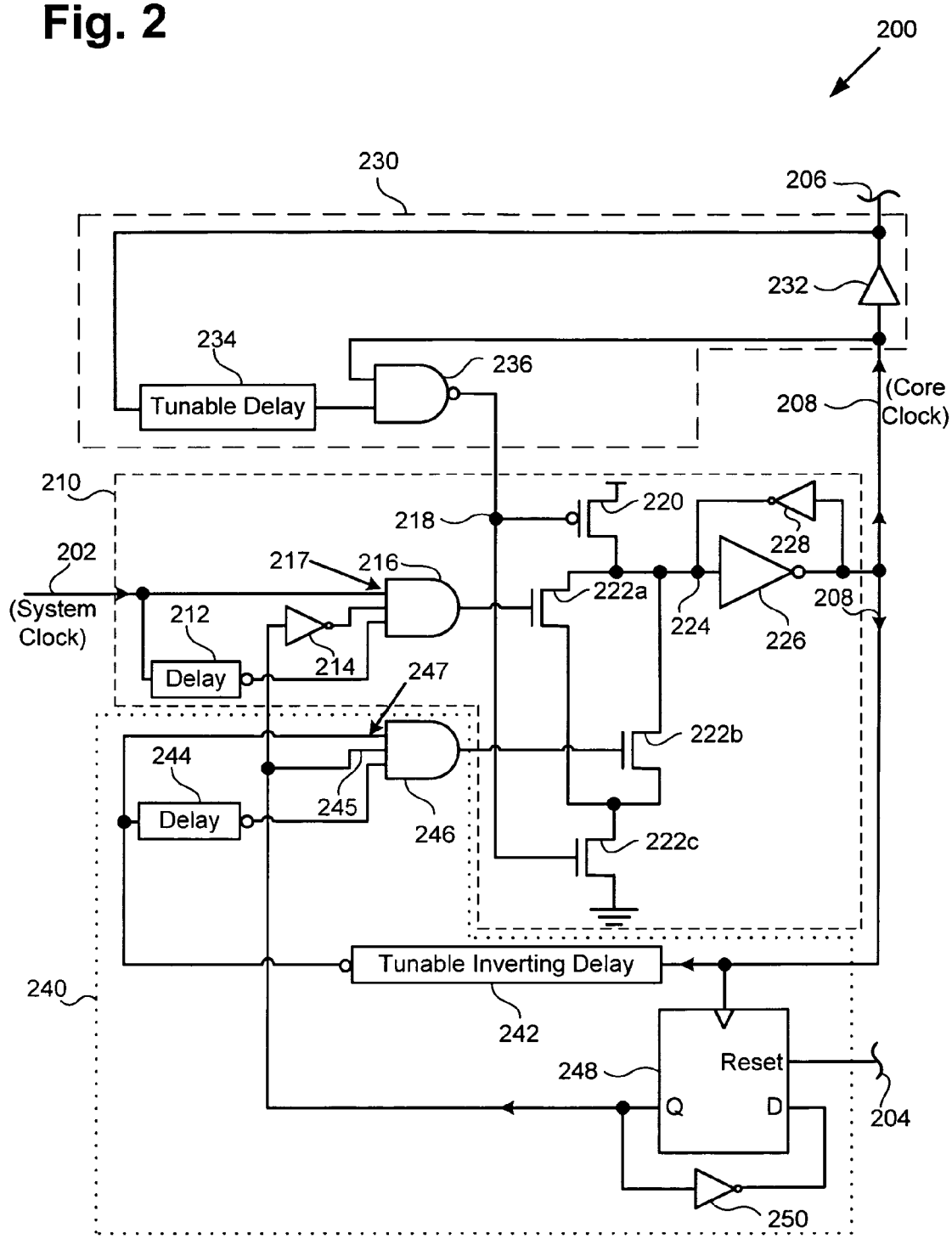
FIG. 2 shows a diagram of a system clock duty cycle independent circuit for core clock generation, according to one embodiment of the present invention.

FIG. 2 shows a diagram of a system clock duty cycle independent circuit for generation of a core clock, according to one embodiment of the present invention, capable of overcoming the drawbacks associated with the conventional implementation described in relation to FIGS. 1A and 1B. FIG. 2 shows circuit 200 receiving system clock 202 and providing core clock 208. Circuit 200, which is configured for producing a core clock from a system clock so that the core clock cycle is independent of the duty cycle of the system clock, comprises system clock receiving sub-circuit 210 for generating a first rising edge of core clock 208, core clock falling edge generation sub-circuit 230 responsive to every rising edge of core clock 208, and self-triggering sub-circuit 240 to trigger a second rising edge of core clock 208 independently of the duty cycle of system clock 202. Also shown in FIG. 2 are reset input 204, and buffered output 206.

Circuit 200 might be implemented as part of a random access memory (RAM), for example, to emulate dual port memory performance using a single port core memory driven by core clock 208. In that implementation, the resulting core clock cycle frequency may be substantially twice that of the frequency of system clock 202. In other embodiments, circuit 200 might be implemented as part of a content addressable memory (CAM), for example, or another type of memory system or device.

In the embodiment of FIG. 2, system clock receiving sub-circuit 210 includes inverting first trigger delay 212, first trigger input inverter 214, first trigger AND gate 216 receiving input 217 directly from system clock 202, and node 218 (also referred to as "charging node 218"). Also included in system clock receiving sub-circuit 210 are P-channel field effect transistor (PFET) 220, N-channel field effect transistors (NFETs) 222a, 222b, and 222c, pre-charge node 224, core clock inverter 226, and core clock feedback inverter 228. As shown in FIG. 2, system clock receiving sub-circuit 210, in conjunction with the other elements of circuit 200, produces core clock 208 as an output, and feeds that output to core clock falling edge generation sub-circuit 230 and self-triggering sub-circuit 240.

Core clock falling edge generation sub-circuit 230 is configured to receive the output of system clock receiving sub-circuit 210. Core clock falling edge generation sub-circuit 230 comprises non-inverting buffer 232, tunable delay 234, and NAND gate 236. As shown in FIG. 2, core clock falling edge generation sub-circuit 230 is further coupled to system clock receiving sub-circuit 210 at charging node 218. Core clock falling edge generation sub-circuit 230 determines the duration of each ON interval of core clock 208. The ON intervals of core clock signal 208 may be adjusted by means of tunable delay 234.

Core clock 208 is also fed to self-triggering sub-circuit 240. As shown in FIG. 2, in the present embodiment self triggering sub-circuit comprises tunable inverting delay 242, inverting self-trigger delay 244, and self-trigger AND gate 246. Also included in self triggering sub-circuit 240 are flip-flop 248, which may be a D flip-flop, for example, and flip-flop feedback inverter 250. Self-triggering sub-circuit 240 is configured to trigger a second rising edge of core clock 208 from a first falling edge of core clock 208, so as to cause the core clock cycle to be independent of the duty cycle of system clock 202. A second core clock rising edge is self-triggered from the falling edge of the first core clock signal after a core clock OFF interval, which may be adjusted using tunable inverting delay 242.

It is noted that the logic performed by the circuit embodied by FIG. 2 can be carried out using circuit elements other than those recited in describing circuit 200. For example, first trigger AND gate 216 and self-trigger AND gate 246 could be equivalently implemented using a combination of NAND gates and inverters, as is known in the art. Similarly, other elements of circuit 200 can be readily substituted to perform the operations of the present embodiment of circuit 200.

Figure 3:
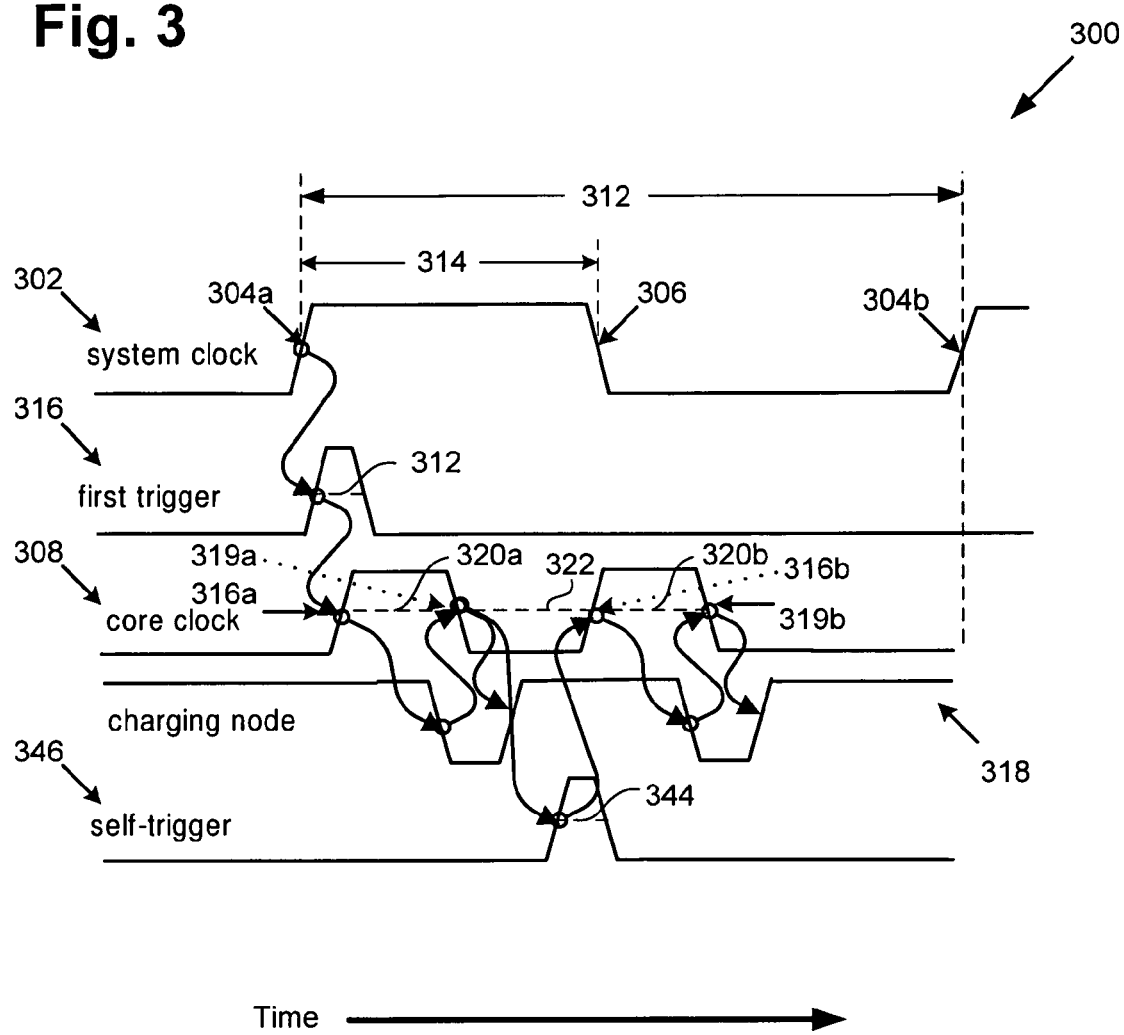
FIG. 3 shows a timing diagram corresponding to the system clock duty cycle independent circuit of FIG. 2, according to one embodiment of the present invention.
Figure 4:
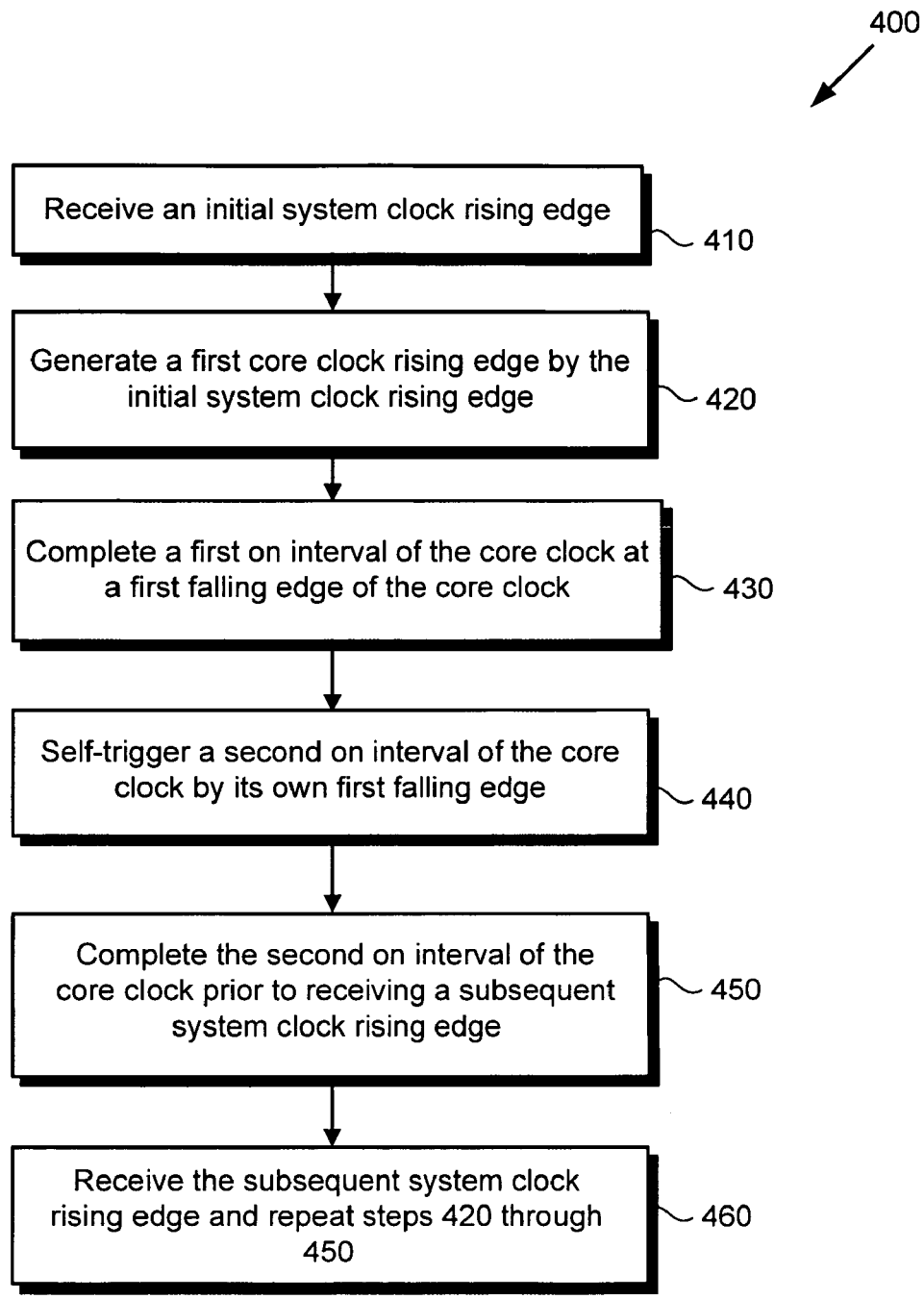
FIG. 4 shows a flowchart of a method for producing a system clock duty cycle independent core clock, according to one embodiment of the present invention.

The operation of circuit 200 in FIG. 2 will be further explained in combination with FIGS. 3 and 4. FIG. 3 shows a timing diagram of the system clock duty cycle independent circuit of FIG. 2, according to one embodiment of the present invention, while FIG. 4 shows a flowchart of an exemplary method for producing a system clock duty cycle independent core clock from a system clock.

Timing diagram 300 in FIG. 3 shows system clock 302 and core clock 308, corresponding respectively to system clock 202 and core clock 208, in FIG. 2. FIG. 3 also shows timing traces for signals appearing at the outputs of first trigger 316 and self-trigger 346, corresponding respectively to outputs of first trigger AND gate 216 and self-trigger AND gate 246, in FIG. 2. In addition, FIG. 3 includes a trace showing the signal at charging node 318, corresponding to charging node 218 in FIG. 2. System clock 302 includes rising edge 304a and falling edge 306 defining ON interval 314, and rising edge 304b, which together with rising edge 304a defines system clock cycle time 312. Moreover, FIG. 3 includes rising first core clock rising edge 316a and second core clock rising edge 316b, first core clock falling edge 319a and second core clock falling edge 319b, first core clock ON interval 320a, second core clock ON interval 320b, core clock OFF interval 322, first trigger pulse width 312, and self-trigger pulse width 344.

FIG. 4, meanwhile, shows flowchart 400 describing the steps, according to one embodiment of the present invention, for producing a system clock duty cycle independent core clock from the system clock. Certain details and features have been left out of flowchart 400 that are apparent to a person of ordinary skill in the art. For example, a step may comprise one or more substeps or may involve specialized equipment or materials, as known in the art. While steps 410 through 460 indicated in flowchart 400 are sufficient to describe one embodiment of the present invention, other embodiments of the invention may utilize steps different from those shown in flowchart 400.

Referring to step 410 of flowchart 400, in conjunction with FIG. 2 and FIG. 3, step 410 comprises receiving an initial system clock rising edge. Preliminary to receiving an initial system clock rising edge, system clock receiving sub-circuit 210 of circuit 200 is placed into an initial ready state as follows: Reset input 204 produces an output LOW from flip-flop 248. The LOW output is inverted by first trigger input inverter 214 to produce a HIGH at the corresponding input to first trigger AND gate 216. Prior to an initial rising edge, system clock 202 is LOW. That LOW is inverted by inverting first trigger delay 212 to provide a HIGH at its corresponding input to first trigger AND gate 216. Thus, two of the three inputs to first trigger AND gate 216 are at a preliminary HIGH, while the third input, at input 217, is LOW, resulting in a preliminary LOW output from first trigger AND gate 216. Elsewhere in system clock receiving sub-circuit 210, pre-charge node 224 is pre-charged by PFET 220. Subsequent to pre-charge, but prior to step 410, core clock 208 is in a preliminary LOW state, as a result, recharging node 218 receives an output HIGH from NAND gate 236, which drives NFET 222c. The described ready state is further shown in FIG. 3, where system clock 302, first trigger output 316, and core clock 308 are LOW, while charging node 318 is HIGH, prior to rising edge 304a of system clock 302.

Step 420 of flowchart 400 comprises generating a first core clock rising edge by the initial system clock rising edge received in step 410. Returning to FIGS. 2 and 3, receipt of system clock rising edge 304a by system clock receiving sub-circuit 210 causes input 217 to go HIGH, matching the other inputs to first trigger AND gate 216. As a result, the output of first trigger AND gate 216 goes HIGH as well, driving NFET 222a. Because of the HIGH outputs concurrently provided by first trigger AND gate 216 and NAND gate 236, NFETs 222a and 222c are concurrently driven, providing a discharge path to ground for pre-charge node 224.

Discharge of pre-charge node 224, resulting from reception by system clock receiving sub-circuit 210 of an initial system clock rising edge, causes the output of core clock inverter 226 to go HIGH, generating a first core clock rising edge of core clock 208. After a time interval set by inverting first trigger delay 212, the output of first trigger AND gate 216 goes LOW, turning off NFET 222a and decoupling pre-charge node 224 from ground. Step 420 is further shown by FIG. 3, where rising edge 304a of system clock 302 causes first trigger 316 to pulse, which in turn generates first core clock rising edge 316a. The time interval corresponding to first trigger pulse width 312 is set by inverting first trigger delay 212, in FIG. 2.

Continuing with step 430 of flowchart 400, step 430 comprises completing a first ON interval of the core clock at a first falling edge of the core clock. Turning once again to FIGS. 2 and 3, first core clock rising edge 316a is provided to core clock falling edge generation sub-circuit 230 responsive to every rising edge of the core clock, whereupon it is delivered as buffered output 206. After a time interval determined by tunable delay 234, the output of NAND gate 236 goes LOW, sending charging node 218 LOW, and permitting pre-charge node 224 to be recharged HIGH. That HIGH input to core clock inverter 226 produces first core clock falling edge 319, completing first core clock ON interval 320a. As can be seen from FIG. 2, tunable delay 234 determines the duration of each core clock ON interval, so that adjustment to tunable delay 234 may produce corresponding adjustment in the ON interval duration of core clock 208. Step 430 is further shown in FIG. 3, where the transition of charging node 318 from HIGH to LOW produces falling first core clock falling edge 319a and completes first core clock ON interval 320a.

Proceeding with step 440 of flowchart 400, step 440 comprises self-triggering a second ON interval of the core clock by the first falling edge of the core clock so as to cause the core clock cycle to be independent of the duty cycle of the system clock. As discussed previously, the first core clock rising edge generated in step 420 is provided to core clock falling edge generation sub-circuit 230 for regulation of a core clock ON interval. In addition, as shown by FIG. 2, the output of core clock inverter 226 is provided to self-triggering sub-circuit 240.

The first core clock rising edge generated in step 420, when fed to self-triggering sub-circuit 240, primes self-triggering sub-circuit as follows: Flip-flop 248 is toggled by the incoming HIGH core clock signal, producing a HIGH output from flip-flop 248. That HIGH output from flip-flop 248 concurrently provides a HIGH at input 245 to self-trigger AND gate 246, and disables first trigger AND gate 216 by providing a LOW output from first trigger input inverter 214. The same incoming HIGH core clock signal that toggles flip-flop 248 passes through tunable inverting delay 242 to provide a LOW at input 247 of self-trigger AND gate 246, while inverting self trigger delay 244 provides a HIGH at the final input of self-trigger AND gate 246. Thus, a rising edge HIGH output provided as core clock 208 disables first trigger AND gate 216 and primes self-trigger AND gate 246 for receipt of a triggering HIGH at input 247.

In the embodiment of FIG. 2, that triggering HIGH is produced by the first falling edge of core clock 208, which results in a LOW output from core clock inverter 226. Core clock 208 going LOW under the circumstances described provides a HIGH output from tunable inverting delay 242, which serves as the triggering HIGH awaited by input 247. The triggering HIGH, combined with the HIGH inputs provided at input 245 and by self-trigger inverting delay 244, result in a HIGH output from self-trigger AND gate 246. The HIGH output of self-trigger AND gate 246 drives NFET 222b that, together with NFET 222c which is once again driven by NAND gate 236, provides a discharge path to ground for pre-charge node 224. As described in relation to the operation of first trigger AND gate 216, discharge of pre-charge node 224 generates a core clock rising edge.

As can be seen from FIG. 2 and FIG. 3, tunable inverting delay 242 determines the duration of first core clock OFF interval 322, so that adjustment to tunable inverting delay 242 may produce corresponding adjustment in the OFF interval duration between first core clock ON interval 320a and second core clock ON interval 320b. As a result, self-triggering sub-circuit 240 can be tuned to assure that a minimum cycle time of core clock 208 is met.

Self-triggering step 440 is further shown by FIG. 3, where first core clock falling edge 319a results in a HIGH at charging node 318 and causes self-trigger 346 to pulse HIGH. The HIGH produced at self-trigger output 346 generates second core clock rising edge 316b and produces second core clock ON interval 320b in FIG. 3, from a first ON interval of system clock 202, shown by ON interval 314 in FIG. 3. In a manner analogous to the case for first trigger output 316, the time interval corresponding to self-trigger pulse width 344 is set by inverting self-trigger delay 244, in FIG. 2. It is noted from FIG. 3 that because second core clock rising edge 316b and second core clock ON interval 320b are self-triggered by first core clock falling edge 319a, rather than by falling edge 306 of system clock signal 302, core clock 308 is independent of the duty cycle of system clock 302.

In step 450 of flowchart 400, the second ON interval of the core clock is completed prior to receiving a system clock rising edge. By completing a second core clock ON interval and producing a second LOW as core clock 208, in FIG. 2, circuit 200 is reset to the ready state described as the state preceding step 410, prior to receipt of a subsequent system clock rising edge. As a result, circuit 200 is capable of providing a core clock frequency that is twice the frequency of the system clock. FIG. 3 shows that completion of second core clock ON interval 320b, marked by second core clock falling edge 319b, causes charging node to go HIGH after a brief interval corresponding to recharge of pre-charge node 224. Consequently, circuit 200 is reset, and system clock receiving sub-circuit is prepared to receive the subsequent system clock rising edge. Step 460 of flowchart 400 comprises repeating steps 410 through 450, to produce additional core clock signals independent of the duty cycle of the system clock.

It is noted that while the described embodiments are exemplary embodiments in which circuit 200 generates a first core clock rising edge from an initial system clock rising edge, those embodiments can be readily adapted to a situation in which a first core clock rising edge is triggered by an initial system clock falling edge. The adaptations to the method of flowchart 400 require only substitution of the expression "system clock falling edge" for "system clock rising edge," throughout the recited steps. Although adaptation of the circuit of FIG. 2 would require reconfiguration to produce the appropriate logic sequence, that reconfiguration is well within the grasp of one of ordinary skill in the art.

By providing a circuit configured to generate a core clock rising edge from a system clock rising edge, and capable of producing a core clock frequency higher than the frequency of the system clock, the present disclosure describes a circuit implementation suitable for use in a wide array of timing applications. Moreover, by self-triggering a second core clock rising edge from a first core clock falling edge, rather than from a falling edge of the system clock, the present disclosures describes an approach that renders the core clock independent of the system clock duty cycle. As a result, the present invention provides a timing solution that successfully avoids the system clock duty cycle related performance uncertainties plaguing conventional approaches.

From the above description of the invention it is manifest that various techniques can be used for implementing the concepts of the present invention without departing from its scope. Moreover, while the invention has been described with specific reference to certain embodiments, a person of ordinary skill in the art would recognize that changes can be made in form and detail without departing from the spirit and the scope of the invention. The described embodiments are to be considered in all respects as illustrative and not restrictive. It should also be understood that the invention is not limited to the particular embodiments described herein, but is capable of many rearrangements, modifications, and substitutions without departing from the scope of the invention.

Thus, circuit and method for generation of duty cycle independent core clock have been described.

The invention claimed is:

1. A circuit for producing a core clock from a system clock such that a core clock cycle is independent of a duty cycle of said system clock, said circuit comprising:
    a system clock receiving sub-circuit for generating a first rising edge of said core clock;
    a core clock falling edge generation sub-circuit responsive to every rising edge of said core clock;
    a self-triggering sub-circuit to trigger a second rising edge of said core clock so as to cause said core clock cycle to be independent of said duty cycle of said system clock.

2. The circuit of claim 1, wherein said core clock falling edge generation sub-circuit includes a tunable delay for adjusting an ON interval of said core clock.

3. The circuit of claim 1, wherein said self-triggering sub-circuit is further configured to determine an OFF interval of said core clock.

4. The circuit of claim 1, utilized in a random access memory (RAM).

5. The circuit of claim 1, utilized in a content addressable memory (CAM).

6. The circuit of claim 1, wherein said core clock has a core clock frequency twice a frequency of said system clock.

7. A method for producing a core clock from a system clock to generate a core clock cycle independent of a duty cycle of said system clock, said method comprising steps of:
    generating a first core clock rising edge by an initial system clock rising edge;
    completing a first ON interval of said core clock at a first falling edge of said core clock;
    self-triggering a second ON interval of said core clock by said first falling edge of said core clock so as to cause said core clock cycle to be independent of said duty cycle of said system clock.

8. The method of claim 7, wherein said second ON interval of said core clock elapses prior to receiving a subsequent system clock rising edge.

9. The method of claim 8, further comprising receiving said subsequent system clock rising edge.

10. The method of claim 7, executed in a random access memory (RAM).

11. The method of claim 7, executed in a content addressable memory (CAM).

12. The method of claim 7, wherein said core clock has a core clock frequency twice a frequency of said system clock.

13. A method for producing a core clock from a system clock to generate a core clock cycle independent of a duty cycle of said system clock, said method comprising steps of:
    generating a first core clock rising edge by an initial system clock falling edge;
    completing a first ON interval of said core clock at a first falling edge of said core clock;
    self-triggering a second ON interval of said core clock by said first falling edge of said core clock so as cause said core clock cycle to be independent of said duty cycle of said system clock.

14. The method of claim 13, wherein said second ON interval of said core clock elapses prior to receiving a subsequent system clock falling edge.

15. The method of claim 13, executed in a random access memory (RAM).

16. The method of claim 13, executed in a content addressable memory (CAM).

17. The method of claim 13, wherein said core clock has a core clock frequency twice a frequency of said system clock.

* * * * *